(12) United States Patent
Drevet

(10) Patent No.: US 9,879,647 B2
(45) Date of Patent: Jan. 30, 2018

(54) ELECTRICITY GENERATOR WITH UNDULATING MEMBRANE

(71) Applicant: EEL Energy, Paris (FR)

(72) Inventor: Jean Baptiste Drevet, Paris (FR)

(73) Assignee: EEL ENERGY, Paris (FR)

( * ) Notice: Subject to any disclaimer, the term of this patent is extended or adjusted under 35 U.S.C. 154(b) by 0 days.

(21) Appl. No.: 14/915,561

(22) PCT Filed: Jul. 8, 2014

(86) PCT No.: PCT/EP2014/064635
§ 371 (c)(1),
(2) Date: Feb. 29, 2016

(87) PCT Pub. No.: WO2015/028182
PCT Pub. Date: Mar. 5, 2015

(65) Prior Publication Data
US 2016/0208767 A1    Jul. 21, 2016

(30) Foreign Application Priority Data

Aug. 28, 2013   (FR) ..................... 13 58239

(51) Int. Cl.
*F03B 13/10*     (2006.01)
*H02K 35/00*    (2006.01)
(Continued)

(52) U.S. Cl.
CPC ............ *F03B 13/10* (2013.01); *F03B 13/188* (2013.01); *F03D 13/20* (2016.05); *H02K 35/00* (2013.01);
(Continued)

(58) Field of Classification Search
CPC ........ F03B 13/10; F03B 13/188; F03D 13/20; F05B 2240/40; H02K 35/00; Y02E 10/28; Y02E 10/38; Y02E 10/728
See application file for complete search history.

(56) References Cited

U.S. PATENT DOCUMENTS

| 4,348,594 A * | 9/1982 | Lipfert ..................... F03D 5/06 290/54 |
| 6,411,015 B1 * | 6/2002 | Toda ..................... H04R 17/00 310/330 |

(Continued)

FOREIGN PATENT DOCUMENTS

| AU | 2012101908 A4 | 4/2014 |
| CN | 102384013 A | 3/2012 |

(Continued)

*Primary Examiner* — Tulsidas C Patel
*Assistant Examiner* — S. Mikailoff
(74) *Attorney, Agent, or Firm* — Muncy, Geissler, Olds & Lowe, P.C.

(57) ABSTRACT

An electricity generator that derives energy from a membrane undulating in a longitudinal direction. The generator having electricity generation modules carried on the membrane, each module having a fixed frame, a movable frame, a coil, and at least one permanent magnet carried by one of the frames in order to generate a voltage when the membrane undulates. The fixed frames are connected to the membrane and the movable frames are disposed at a distance from a neutral axis of the membrane so that, when the membrane undulates in the longitudinal direction, the moveable frame of each electricity generation module slides in a rectilinear movement with respect to the fixed frame so as to generate electrical voltages in the coils of each module.

10 Claims, 3 Drawing Sheets

(51) Int. Cl.
*F03B 13/18* (2006.01)
*F03D 13/20* (2016.01)

(52) U.S. Cl.
CPC ............ *F05B 2240/40* (2013.01); *Y02E 10/28* (2013.01); *Y02E 10/38* (2013.01); *Y02E 10/728* (2013.01)

(56) References Cited

U.S. PATENT DOCUMENTS

| | | | | |
|---|---|---|---|---|
| 6,424,079 B1 * | 7/2002 | Carroll | ................... | H02N 2/185 310/339 |
| 7,525,205 B2 * | 4/2009 | Mabuchi | ............... | B60C 23/041 290/1 R |
| 7,626,281 B2 * | 12/2009 | Kawai | ................. | F03D 5/06 290/1 R |
| 8,426,999 B2 * | 4/2013 | Drevet | ................. | E21B 41/0085 290/43 |
| 8,525,390 B2 * | 9/2013 | Allaei | ................... | H02N 2/185 310/319 |
| 8,610,304 B2 * | 12/2013 | Filardo | .................. | F03B 17/06 290/43 |
| 9,222,465 B2 * | 12/2015 | Thorp | ................... | F03D 9/002 |
| 9,410,527 B2 * | 8/2016 | Hsu | ............................ | F03G 7/08 |
| 9,447,774 B2 * | 9/2016 | Olsen | ..................... | F03D 9/002 |
| 2008/0297119 A1 * | 12/2008 | Frayne | ..................... | F03B 5/00 322/3 |
| 2009/0295163 A1 * | 12/2009 | Frayne | .................. | F03B 17/06 290/54 |
| 2010/0084871 A1 * | 4/2010 | Filardo | ................... | F03B 17/06 290/54 |
| 2013/0020806 A1 * | 1/2013 | Hsu | ........................... | F03G 7/08 290/54 |
| 2013/0214532 A1 * | 8/2013 | Hsu | ......................... | F03B 17/06 290/43 |
| 2014/0023481 A1 * | 1/2014 | Drevet | .................. | F03D 13/20 415/90 |
| 2016/0208767 A1 * | 7/2016 | Drevet | ................. | F03B 13/188 |

FOREIGN PATENT DOCUMENTS

| | | |
|---|---|---|
| DE | 10 2008 050 238 A1 | 4/2010 |
| DE | 10 2009 047 232 A1 | 6/2011 |
| JP | 2012-237278 | 12/2012 |
| WO | WO 2012/123465 A2 | 9/2012 |

* cited by examiner

ELECTRICITY GENERATOR WITH UNDULATING MEMBRANE

The invention relates to the general field of electricity generators intended to be immersed in a flow of fluid in order to capture mechanical energy therein by means of a membrane undulating in the flow. This generator is arranged so as to convert at least some of the mechanical energy that it captures into electrical energy.

BACKGROUND TO THE INVENTION

An electricity generator comprising a membrane and a support for the membrane is known from the patent document WO 2012/123465 A2, the membrane being adapted to undulate in a longitudinal direction of the membrane when it is immersed in a fluid flowing in a given direction and is supported by the membrane support.

This generator of the prior art further comprises a plurality of electricity generation modules carried by the membrane. Each electricity generation module comprises:
 a fixed frame;
 a frame able to move with respect to the fixed frame;
 a coil carried by one of the frames;
 at least one permanent magnet also carried by one of the frames;
 said coil and said at least one permanent magnet being arranged and disposed so that, when the movable frame moves with respect to the fixed frame, an electrical voltage appears in the coil.

The fixed frames of the modules of this generator of the prior art comprise:
 either rigid lever arms fixed to the membrane and articulated on each other in order to make coils pivot with respect to magnets when the membrane undulates (in this embodiment, the lever arms greatly constrain the forms and amplitudes of the undulation of the membrane);
 or magnets and coils fixed at intervals along the membrane, which limits the electrical generation efficiency.

OBJECT OF THE INVENTION

One object of the present invention is to obtain an electricity generator capable of having, at least under certain conditions, improved efficiency.

SUMMARY OF THE INVENTION

To this end, according to the invention, an electricity generator is proposed, comprising:
 a membrane and a support for the membrane, the membrane being adapted to undulate in a longitudinal direction of the membrane when it is immersed in a fluid flowing in a given direction and is supported by the membrane support;
 at least one electricity generation module carried by the membrane.
Each at least one electricity generation module comprises:
 a fixed frame;
 a frame able to move with respect to the fixed frame;
 a coil carried by one of the frames;
 at least one permanent magnet also carried by one of the frames;
 said coil and said at least one permanent magnet being arranged and disposed so that, when the movable frame moves with respect to the fixed frame, an electrical voltage appears in the coil.

The generator according to the invention is essentially characterised in that the fixed frames of the electricity generation modules are connected to this membrane and the movable frames are disposed at a distance from a neutral axis of the membrane so that, when the membrane undulates in its longitudinal direction, there is, for each electricity generation module, a movement of the movable frame of this module by rectilinear sliding with respect to the fixed frame of this same module so as to generate electrical currents in the coils of said modules.

The use of electricity generation modules solely carried by the membrane and connected to the latter so as to have, for each module, a rectilinear sliding of a movable frame with respect to a fixed frame at a distance from the membrane neutral axis affords a mechanical amplification of the relative speed of movement between the corresponding fixed and movable frames. Because of this, for a given undulation of the membrane, the electrical voltage that can be generated by a given module is amplified. Thus, at least for certain types of excessively slow fluid flow, the efficiency of the electricity generator according to the invention is improved compared with electricity generators of the prior art, such as the aforementioned ones of document WO 2012/123465 A2.

In the aforementioned embodiments of the document WO 2012/123465 A2 all the frames are fixed directly to the membrane and there is never any rectilinear sliding, at a distance from the neutral axis, between a fixed frame and a corresponding movable frame. The relative speeds of movement between these frames are consequently lower and the electrical voltage that can be generated is reduced accordingly.

The neutral axis of the membrane is a curve extending along the membrane and placed at the middle of the thickness of this membrane. By creating a distance between the movable frame and the neutral fibre of the membrane for a given longitudinal curvature angle of the membrane, the amplitude of rectilinear sliding of the movable frame with respect to the fixed frame that corresponds thereto is increased.

Consequently, if, for a given module, the distance is increased between the membrane neutral axis and the movable frame of its module, for a given wave propagating along a membrane, it is found that:
 firstly, the amplitude of the rectilinear/linear movement of the movable frame with respect to the fixed frame is increased; and that
 secondly, the speed of movement of the movable frame with respect to the fixed frame is also increased.

As the voltage generated on a given coil is proportional to the speed of rectilinear movement/sliding of the movable frame with respect to the fixed frame, by increasing the speed of the linear sliding, the electricity generation module according to the invention affords an increase in the voltage at the terminals of its coil.

Since the electrical power supplied by a coil is proportional to the square of the voltage generated by the same coil, the invention, by enabling the movable frames to move away from the neutral axis of the membrane, increases the electrical power generated by its modules by the square of the increase in the sliding speed recorded.

Thus the moving away of the sliding directions of the movable frames with respect to the neutral axis is particularly advantageous since this makes it possible to increase the speed of the rectilinear sliding, which assists the appearance of an electrical voltage at the terminals of the coils, even if the speed of movement of the wave in the membrane is small. Consequently the generator according to the invention has improved efficiency for slow fluid flow speeds.

Another advantage of the generator according to the invention is that it makes it possible to increase the electrical power generated by a given module without having to increase the cross-section of the wire forming its coils. It suffices in fact to increase the distance between the neutral axis of the membrane and the direction of rectilinear sliding of a movable frame in order to increase the electrical power produced by this module.

A corollary of this advantage is that the invention makes it possible, since the distance between the direction of sliding and the neutral axis is increased, to reduce the size of the electricity generation modules without necessarily affecting the electrical power generated by the generator in a given fluid flow.

The generator according to the invention can thus be lightened, and can have a lower manufacturing cost while, when placed in a slow flow, providing electrical power with satisfactory efficiency. Ideally, the distance between the neutral axis of the membrane and the movable frame of this module is greater than or equal to the thickness of the membrane.

In a preferential embodiment of the invention, the movable frame of at least one of said electricity generation modules has an inherent articulation axis through which there are transmitted to it forces relating to the rectilinear sliding of this movable frame with respect to the fixed frame of this same module, this inherent articulation axis being perpendicular to a direction of rectilinear sliding of this movable frame with respect to the fixed frame of the same module, and the distance by which this articulation axis moves away with respect to a surface of the membrane facing this module is at least equal to the thickness of the membrane.

This distance by which the articulation axis moves away with respect to the neutral axis corresponds to the distance between the direction of rectilinear sliding of the movable frame with respect to the fixed frame of the module and the neutral axis.

The greater this distance between the direction of rectilinear sliding particular to a module and the neutral axis, the more the speed of sliding of the movable frame with respect to the fixed frame is accelerated. Thus it can be ensured that this distance between the direction of sliding and the neutral axis is chosen according to the speed of flow in which it is wished to make the generator of the invention function.

The lower the speed of the flow, the greater the distance between the direction of sliding and the neutral fibre.

In a preferential embodiment of the invention, the modules carried by the membrane and the membrane are such that, during the undulation of the membrane in its longitudinal direction, the directions of rectilinear sliding of each movable frame of the modules are always parallel to a longitudinal cross-sectional plane A-A of the membrane in which the longitudinal direction of this membrane extends.

The fact that the rectilinear sliding directions of the modules are always placed parallel to a longitudinal cross-sectional plane of the membrane is advantageous since in this way the transfer of energy between the membrane and the modules is improved. This is because the membrane and the modules all deform in directions that are parallel to the same longitudinal cross-sectional plane of the membrane.

According to a preferential embodiment of the invention, each of the electricity generation modules has an inherent length that extends parallel to a longitudinal cross-sectional plane of the membrane in which said longitudinal direction of the membrane is situated.

The fact that the modules are all parallel to the longitudinal direction of the membrane assists the flow of fluid along the membrane and thus improves the efficiency of the device.

Ideally, the particular length of a module is strictly parallel to the direction of rectilinear sliding of the movable frame of this module with respect to its fixed frame.

According to a preferential embodiment of the invention, at least some of the electricity generation modules are aligned with each other in an alignment direction also parallel to the longitudinal cross-sectional plane of the membrane. The modules aligned in the alignment direction are preferentially covered with a shroud extending parallel to the longitudinal direction of the membrane.

By grouping together the modules in an alignment parallel to the direction of flow of the fluid, the efficiency of the device is improved.

It should be noted that the aligned modules are not necessarily covered with a shroud, but the use of such a shroud remains preferable in order to improve the hydrodynamics and optionally the sealing of the modules.

BRIEF DESCRIPTION OF THE DRAWINGS

Other features and advantages of the invention will emerge clearly from the description given below, by way of indication and in no way limitatively, with reference to the accompanying drawings, in which.

DETAILED DESCRIPTION OF THE INVENTION

Figure 1:
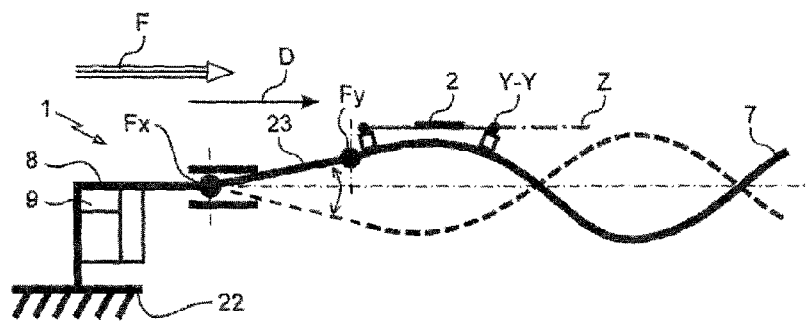
FIG. 1 depicts a side view of an electricity generator according to the invention comprising an electricity generation module solely carried by the undulating membrane of the generator.
Figure 2:
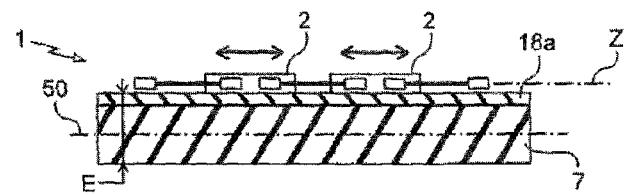
FIG. 2 depicts a view in partial cross-section of a flattened membrane of an electricity generator according to the invention, this membrane carrying on one of its faces two electricity generation modules of a first type.

As indicated previously, the invention relates essentially to an electricity generator 1 provided with a membrane 7 adapted to undulate in a flow of liquid F. This electricity generator 1 is a hydrokinetic generator which, at least in some embodiments, can function with a slow liquid fluid flow, that is to say less than 1 meter per second. The electricity generator 1 comprises a support 8 for a membrane 7 provided with means 22 for anchoring the generator 1 in order to fix it in its environment and prevent drifting thereof in the flow of fluid F.

The support 22 has upstream attachment means 23 connected closer to an upstream edge 7a of the membrane 7 than to a downstream edge 7b of the membrane 7 placed in the flow F. Under the effect of this flow, the membrane undulates with respect to the support 8.

Ideally, the support 8 has downstream attachment means placed downstream of the upstream attachment means. These downstream attachment means (not shown) are arranged to prevent the membrane tightening in its longitudinal direction D and to force the membrane to curve. In other words, the distance between the upstream attachment means 23 and the downstream attachment means is less than the length of the membrane tensioned in a plane.

It should be noted that the longitudinal direction D of the membrane is an axis extending between an upstream edge 7a and a downstream edge 7b of the membrane 7.

As the membrane 7 is always kept curved, provided that it is placed in a flow F, one face of the membrane forms an obstacle to the flow of the fluid F at the curvature of the membrane. There is then a differential in pressure on either side of the membrane that forces the membrane to change curvature. This change in curvature is permanent as long as there is a flow F and this phenomenon promotes the undulation of the membrane 7 in the flow F.

The membrane support 8 may, as depicted in FIG. 8, have angular stops for limiting the angular movement of the attachment means 23 about a fixed pivot axis. The membrane is articulated on the attachment means 23 at its leading edge 7a. This leading edge 7a may thus be moved firstly by rotation of the attachment means 23 with respect to the fixed pivot axis Fx and by rotation about the articulation Fy that connects it to the attachment means 23. The pivot axis Fx and the articulation are along pivot axes parallel to each other and preferentially horizontal. These pivot axes Fx and Fy are perpendicular to the longitudinal direction D of the membrane 7, parallel to the upstream edge 7a of the membrane 7 and perpendicular to the longitudinal cross-sectional plane of the membrane A-A.

The membrane 7 ideally has one or more bands 18a, 18b extending parallel to the longitudinal direction D of the membrane 7. Each at least one band 18a, 18b is arranged to locally stiffen the membrane while enabling it to undulate in the flow F.

Electricity generation modules 2 described below are connected to the membrane, preferentially at points on the membrane that comprise a band 18a, 18b. Thus the membrane 7 has less tendency to deform under the effect of mechanical firmness applied by the modules 2 to the membrane 7. In this way the transfer of energy from the membrane 7 to these modules 2 is improved.

Typically, the electricity generation modules 2 are grouped together in one or more groups of modules Gp1 and/or Gp2. The modules in the same group are preferentially aligned with each other, that is to say they all extend in the same longitudinal cross-sectional plane A-A of the membrane. As can be seen in FIG. 6d, each group Gp1, Gp2 of modules 2 can be assembled along a band of the membrane 18a, 18b that corresponds to it. The bands 18a, 18b are on opposite sides of the membrane, which comprises a central core on which the bands 18a, 18b are adhesively bonded.

Figure 7:
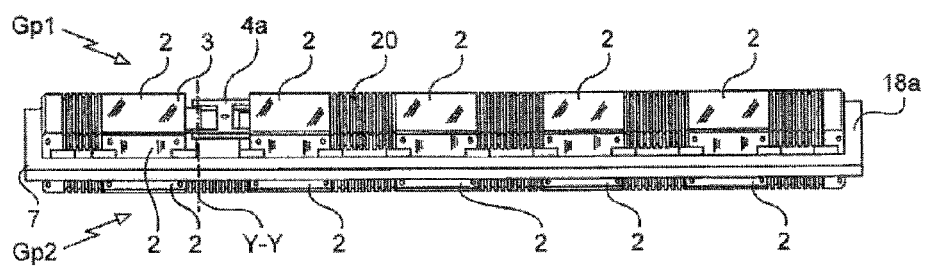
FIG. 7 depicts two groups of electricity generation modules fixed on either side of a band, this band being designed to be assembled and placed between lateral membrane portions.
Figure 8A:
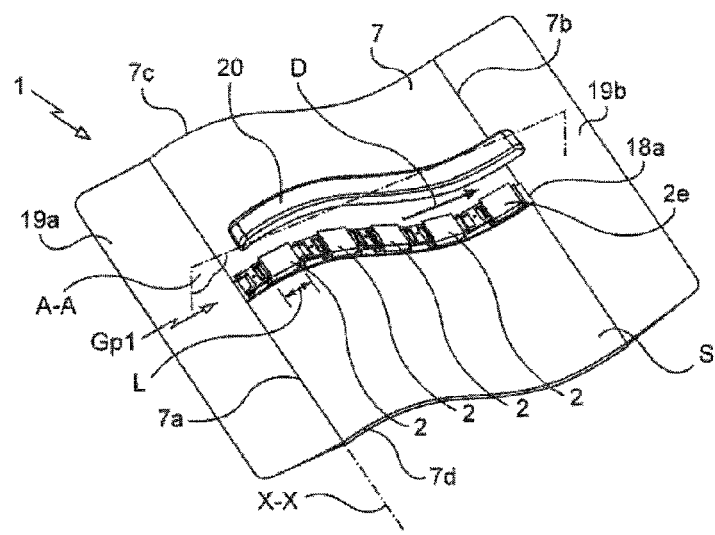
FIG. 8a presents a membrane provided with a band placed between lateral portions of the membrane, this band carrying a group of modules assembled together and forming an alignment module.
Figure 8B:
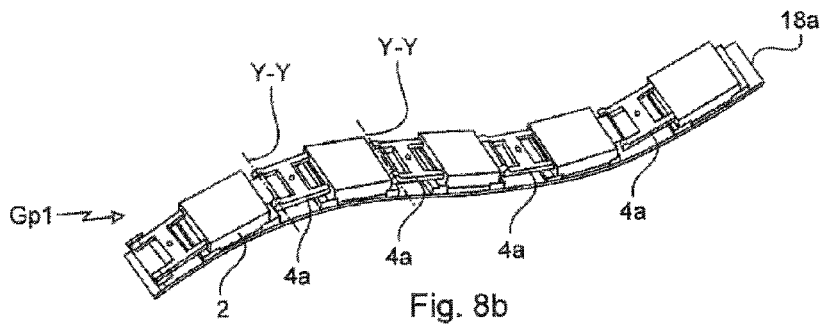
FIG. 8b presents a group of electricity generation modules assembled together in an alignment and carried by a membrane band.

Alternatively, as can be seen in the embodiments in FIGS. 7, 8a and 8b, the groups of aligned modules Gp1, Gp2 are all assembled on either side of a single band 18a of the membrane belonging to the membrane 7.

The band or bands 18a, 18b is or are preferentially placed in a longitudinal symmetry plane of the membrane A-A, at equal distances from its lateral edges 7c, 7d. By thus aligning the modules 2, the sliding of the fluid over the modules is improved, compared with the case where one or more of these modules are disposed not parallel to the longitudinal cross-sectional plane A-A and consequently not parallel to the direction of the flow F.

The efficiency of the generator 1 is thus preserved since the impact of the modules 2 on the flow driving the undulation is limited.

Ideally, the membrane 7 comprises upstream and downstream deflecting panels 19a, 19b. The upstream panel 19a extends parallel to an upstream edge 7a, referred to as the leading edge. The downstream panel 19b extends parallel to a downstream edge 7b, referred to as the trailing edge, of the membrane 7. Preferentially, each at least one band 18a, 18b joins these upstream and downstream deflecting panels 19a, 19b so that a pivoting of either one of these panels 19a, 19b about a pivot axis X-X perpendicular to the longitudinal cross-sectional plane A-A generates a longitudinal flexing of the band 18a, 18b, at least close to the connection of the band 18a, 18b to the panel 19a, 19b thus pivoted.

It should be noted that the modules 2 in the same group of modules Gp1, Gp2 may be enclosed in a sealed elastomeric block 20, for example produced by insert moulding of the modules assembled together. Such a shroud 20 improves the hydrodynamics of the modules and further promotes the efficiency of the electricity generator 1.

This shroud 20, depicted in FIGS. 7 and 8a, is sealed and flexible. Portions of the shroud 20 placed between two adjacent modules 2 and aligned with each other may comprise concertina bellows 21 arranged so as to locally increase the flexibility of the shroud 20. Such bellows 21 are visible in FIG. 7.

In each of the embodiments of the generator 1 according to the invention, the membrane 7 carries one or more electricity generation modules 2.

Each electricity generation module 2 comprises:
a fixed frame 3;

a frame 4 able to move with respect to the fixed frame 3;
a coil 5 carried by one of the frames 3, 4;
at least one permanent magnet 6 also carried by one of the frames 3, 4.

The coil 5 and the permanent magnet 6 are arranged and disposed with respect to the frames of the module 2 so that, when the movable frame 4 of this module 2 moves in a rectilinear sliding with respect to the fixed frame 3 of this module 2, an electrical voltage appears in the coil 5 of the module 2. If this coil is connected to a conductive dipole, it generates both current and an electrical voltage.

The generator 1 is also characterised in that the fixed frames 3 of the electricity generation modules 2 are connected to the membrane 7, which carries them so that each movable frame 4 is disposed at a distance from a neutral axis 5 of the membrane 7 and so that, when the membrane 7 undulates in its longitudinal direction D, there is, for each electricity generation module 2, a rectilinear sliding movement Z of the movable frame 4 of this module 2 with respect to the fixed frame 3 of this same module 2.

Each module is thus deformable in a rectilinear sliding direction Z of its movable frame 4 with respect to its fixed frame 3.

The modules 2 are connected to the membrane so that, when the membrane undulates in its longitudinal direction, it forces each module 2 to deform alternately in a rectilinear sliding direction Z particular to the module and thus to generate an electrical voltage on its coil.

In the embodiments of the modules depicted in FIGS. 1 to 8b, each electricity generation module 2 has a rectilinear sliding direction Z that is particular to it. This sliding direction Z passes through an articulation axis Y-Y by means of which the sliding forces of the movable frame 4 with respect to the fixed frame 3 are transmitted.

Preferentially, the fixed frames 3 are connected to the membrane 7 by means of deformable elastic studs 15 to allow a relative movement between a point 15a of connection of a fixed frame with an elastic stud 15 that corresponds to it and a point 15b of assembly of this same elastic stud 15 with the membrane 7.

The advantage of the studs 15 is such that, when the membrane deforms, mechanical energy is then transmitted via the elastic studs 15 to the electricity generation modules 2. The studs 15 effect a smoothing of the maximum energy transmitted to the modules 2 since they have a tendency to elongate/compress elastically at the moment of the peak traction/compression forces of the studs. In this way the instantaneous forces transmitted between the membrane and the modules 2 are limited while allowing an accumulation of mechanical energy by elastic deformation of the studs 15. This energy thus accumulated in the studs 15 can be delivered to the modules gradually, which assists the spreading over time of the range of production of current at each coil.

Figure 3:
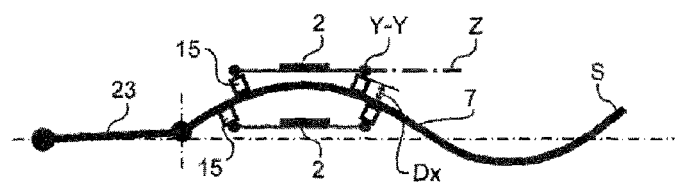
FIG. 3 presents an electricity generator according to the invention, the electricity generation modules of which are disposed on opposite faces of the membrane.
Figure 4:
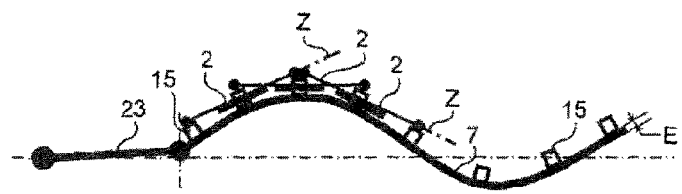
FIG. 4 presents a method of assembling electricity generation modules according to which each electricity generation module is connected to the membrane by two studs, these modules being connected to the membrane in an implantation pattern where a first one of the studs of a first module is placed between stud implantation levels of a second module and where the second of the studs of this first module is placed between stud implantation levels of a third module.

It can also be ensured that the movable frame 4 is also connected to the membrane:
  either directly, as is for example the case with the embodiments in FIGS. 1, 3, 4, by means of an elastic stud 15, on which the movable frame is articulated on an articulation axis Y-Y;
  or indirectly, as is for example the case with the embodiments in FIGS. 2, 6d, 7, 8a, 8b, via a part articulated at its ends 4a that connects the movable frame 4 to a fixed frame 3 of another module 2, this other module 2 itself being fixed to the membrane via a stud 15 that is particular to it.

In the embodiments in FIGS. 2, 6d, 7, 8a, 8b, at least some of the modules 2 form a first group of modules Gp1 aligned along a first membrane face S, and optionally some other modules 2 form a second group of modules Gp2 aligned along a second membrane face. These alignments are parallel to the direction D. The modules 2 belonging to a group of aligned modules Gp1, Gp2 are connected together so that a movable frame 4 of a given module 2 in this group of modules Gp1 is mechanically connected to a fixed frame 3 of another given module 2 in this group Gp1. This connection is such that the relative movement of the fixed frames 3 of two given modules 2 thus connected together causes, for one of these modules connected together, the movement of its movable frame 4 with respect to its fixed frame 3.

This mechanical connection between a movable frame 4 of a given module 2 and a fixed frame 3 of another given module 2 is achieved by means of an articulated part 4a. The part 4a is articulated firstly with the fixed frame 3 of a module 2 and secondly with the movable frame 4 of another module. This part 4a may have an H shape so as to install as a clevis each of the frames 3, 4 that it connects together.

Each of the articulated parts 4a connecting a fixed frame 3 of one module to a movable frame 4 of another module also extends in the longitudinal cross-sectional plane A-A of the membrane 7 in which the longitudinal direction D of this membrane 7 extends.

As can be seen in particular in FIGS. 6d, 7, 8a and 8b, each part 4a is connected to a movable frame 4 by an articulation axis Y-Y perpendicular to the longitudinal cross-sectional plane A-A of the membrane. Each part 4a has another end articulated with a fixed frame of a module, this articulation being along a second articulation axis parallel with respect to the articulation axis Y-Y.

The membrane 7, which undulates and deforms, generates rectilinear sliding forces of the movable frame 4. These forces are transmitted to the movable frame 4 via the part 4a, which is articulated on the articulation axis Y-Y. Each axis Y-Y is perpendicular to the rectilinear sliding direction Z of the movable frame 4 to which it is connected. As illustrated in particular in FIGS. 6b and 6d, a separation distance Dx of this articulation axis Y-Y with respect to a surface S of the membrane enables the direction of rectilinear sliding Z to be moved away with respect to the neutral axis 50 of the membrane. This separation distance Dx is at least equal to the thickness E of the membrane 7. Ideally the separation distance of the second articulation axis of the part 4a with respect to the neutral axis is also greater than the thickness E of the membrane 7.

As can be seen in particular in FIG. 6d, the flexing of the membrane 7 along the flexion axes perpendicular to its longitudinal cross-section plane A-A generates a movement of the part 4a, and the further away the articulation axes of the part 4a are from the neutral axis 50 of the membrane, the greater this movement. Thus the distance Dx between the membrane face opposite the movable frame and the axis Y-Y determines the amplification of the sliding movement according to the flexion angle of the membrane.

This amplification distance Dx is chosen so as to be great when the generator is intended to have a slow undulation speed. Conversely, this amplification distance Dx is chosen to be small when the generator 1 is intended to have a fast undulation speed.

Figure 6A:
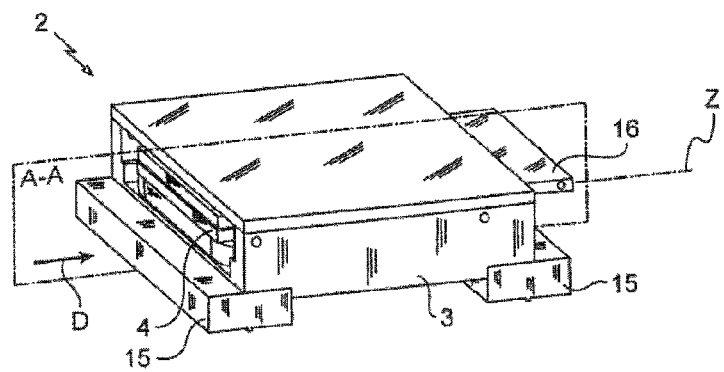
FIG. 6a presents a perspective view of a preferential embodiment of an electricity generation module according to the invention.
Figures 6B, 6C:
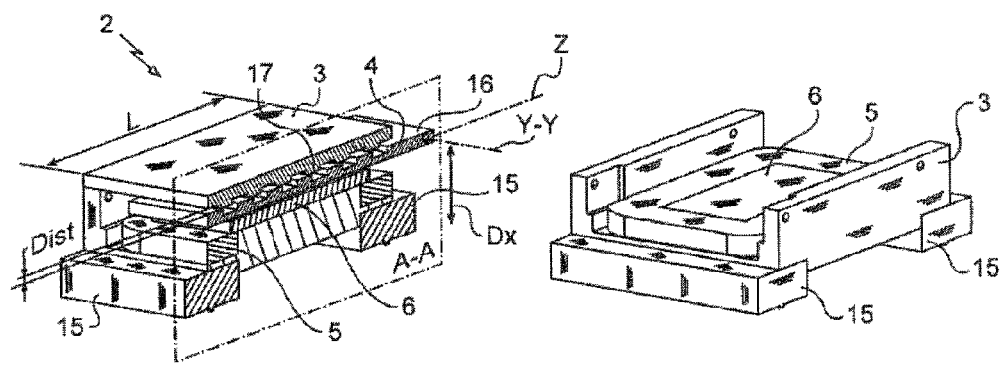
FIG. 6b presents a view in cross-section along a longitudinal cross-sectional plane A-A of the module of FIG. 6a, this plane A-A being the longitudinal cross-sectional plane of the membrane.
FIG. 6c presents a view of the fixed frame of the generation module of FIGS. 6a and 6b.
Figure 6D:
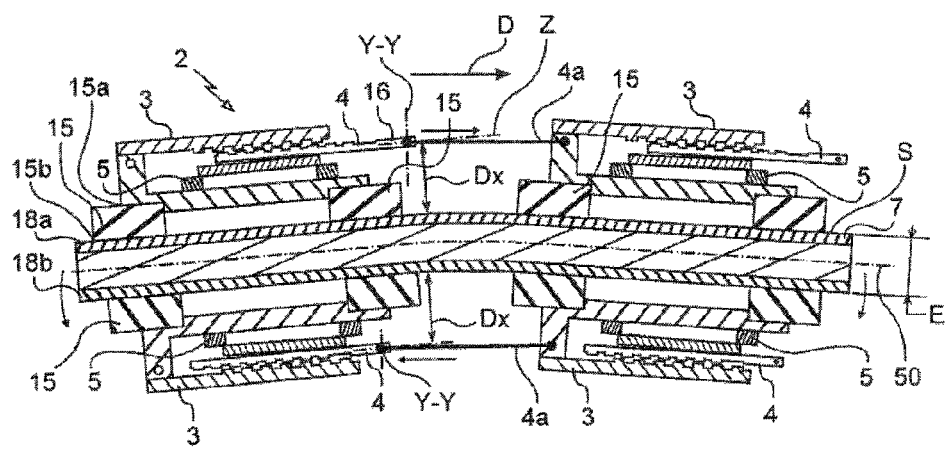
FIG. 6d is a view in cross-section of a portion of a membrane of an electricity generator according to the invention, electricity generation modules are located on either side of the membrane in alignments parallel to the longitudinal cross-sectional plane A-A of the membrane.

As can be seen in FIGS. 6b, 6c and 6d, the fixed frame 3 of a module 2 carries a coil 5 and said at least one permanent magnet 6 of this same module. The movable frame 4 comprises a bar 16 moving facing said at least one magnet 6 when the membrane 7 undulates in its direction D.

The bar 16 has a shape such that, during this movement of the bar 16 with respect to the magnet 6, there is an inter-bar distance Dist measured between the bar 16 and a counter-bar 17 carried by the fixed frame 3 that varies in alternation.

The inter-bar distance Dist is the minimum distance, measured in a fixed direction with respect to the magnet, that separates the bar from a given fixed point on a counter-bar carried by the fixed frame 3. The counter-bar 17 is any part placed facing the bar of the movable frame and such that, when the bar 16 of the movable frame 4 slides with respect to the counter-bar 17, there is an inter-bar distance Dist measured between a point on the counter-bar 17 and the bar 16 that varies in alternation between minimum and maximum distances. The place where the distance Dist is measured is facing the magnet 6 and in a direction preferentially passing through north/south poles of the magnet 6.

The counter-bar 17 is a metal part through which a magnetic field generated by the magnet 6 passes.

As depicted in FIGS. 6b, 6d, the fixed frame 3 may be formed so as to surround the moving frame 4, which thus slides in the fixed frame 3. The magnet 6 and the counter-bar 17 are connected to the fixed frame 2 and are respectively placed on either side of the movable frame 4. The magnet 6 forms, with the counter-bar 17, a kind of tube in which the movable frame 4 slides, which makes it possible to have magnetic field lines of the magnet 6 that emerge from one pole, on one side of the magnet 6, follow the sides of the tube and return to the other pole of the magnet 6, on another side of the magnet 6. The counter-bar 17 has a profile such that there exists an irregular distance between this counter-bar and a sliding plane of the movable frame 4. This sliding plane passes through the axis Y-Y. Typically, the counter-bar 17 has a crenellated form.

Likewise, the movable frame 4 has a bar profile such that there exists an irregular distance between this bar 16 and the sliding plane of the movable frame 4.

Typically, the profiles of the bar 16 and of the counter-bar 17 are crenellated in shape. The high portions of the crenellations of the counter-bar 17 are facing each other and are aligned parallel to the sliding plane of the movable frame 4. These crenellated profiles have identical pitches and preferentially a single identical crenellation depth for these two profiles. The hollows of the crenellations extend parallel to the articulation axes Y-Y.

The crenellated high portions of the movable frame 4 are also aligned parallel to the sliding plane of the movable frame 4.

Thus, when the movable frame 4 slides, the inter-bar distance Dist varies in alternation, changing in turn between:
 a minimum inter-bar distance, measured between a high part of the movable frame 4 and a high part of the counter-bar 17, when these high parts are facing each other; and
 a maximum inter-bar distance, measured between a hollow part of the crenellations of the movable frame 4 and a hollow part of the crenellations of the counter-bar 17, when these hollow parts are facing each other.

Although the counter-bar 17 presented in FIGS. 6a to 6d is always placed on a side of the bar 16 that is opposite with respect to the side of the bar 17 facing the magnet 17, it is also possible to have a counter-bar 17 placed between the magnet 6 and the movable frame 4. In some embodiments, it is also possible to have a counter-bar 17 on either side of the movable frame 4. In all cases, the counter-bar 17 and the bar 16 each have irregular profiles so that the minimum distance Dist that separates them, measured at a point of the counter-bar 17, always varies in alternation during the movement of the bar 16 of the movable frame 4 with respect to the counter-bar 17 of the fixed frame 3.

As in the embodiment in FIGS. 6b, 6c and 6d, the coil 5 of the module 2 surrounds the magnet 6 of the module, causing an undulation of the membrane 16, a movement of the bar 16 with respect to the counter-bar 17 is generated and then a variation over time in the inter-bar distance Dist is forced. This variation in inter-bar distance Dist creates a variation in the magnetic flux passing through the coil 5, thus causing an electrical voltage in the coil. The bar 16 and the counter-bar 17 are made from ferromagnetic material or materials, which makes it possible to influence the magnetic flux that passes through them and thus to create a variation in flux in the coil 5.

Figure 5:
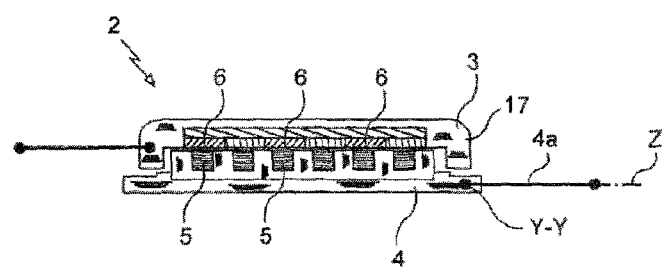
FIG. 5 presents a partial cross-section of a particular embodiment of an electricity generation module for implementing a generator according to the invention, this module having magnets and coils carried on separate frames of the module.

In the alternative embodiment presented in FIG. 5, the magnets 16 and the coils 5 are carried by separate frames. It should be noted that it is possible for a module to carry a plurality of magnets and/or a plurality of coils distributed over its frames.

Finally, as depicted in FIG. 1, the generator according to the invention may comprise at least one converter circuit 9 distant from the modules 2. At least some of the coils 5 of the modules 2 being electrically connected to the distant converter circuit 9 by means of electrical conductors and said at least one distant converter circuit 9 being arranged so as to generate, from the electrical voltages generated by at least some of the coils 5 that are connected to it, an output electrical current at the output terminals of this at least one distant converter circuit 9.

The use of such a converter circuit 9 connected to a plurality of coils 5 enables the electricity generator 1 to continue to function even if some of the coils that are connected to the converter 9 have become defective. The endurance of the generator 1, which can continue to function in degraded mode, without requiring a maintenance operation, is thus improved.

Each at least one converter circuit 9 is disposed at a distance from the membrane 7 so as to be able to remain immobile with respect to the undulating membrane 7. The risk of degradation of the converter circuit 9, which remains fixed and does not undulate with the membrane, is thus limited. Maintenance work on this fixed converter circuit is also facilitated.

Another advantage of this converter circuit 9 is that it makes it possible to accumulate the electrical energy coming from a plurality of coils in order to deliver electrical power greater than the electrical powers individually produced by the coils 5.

The converters 2 may be arranged on the membrane in a plurality of patterns. For example, they may be disposed on a single face or on both faces of the membrane. In the case where the converters 2 are disposed on opposite faces of the membrane, they will preferentially be aligned in planes parallel to the longitudinal cross-sectional plane A-A of the membrane and will be distributed symmetrically with respect to a plane A-A extending at equal distances from the sides 7a, 7d of the membrane.

It is possible to have for example a plurality of alignments of modules distributed over one or more faces of the membrane.

Preferentially, as depicted in FIG. 3, when the modules are located on opposite faces of the membrane, it is ensured that a module disposed along one face is placed opposite another module situated on the other face of the membrane. This makes it possible firstly to balance the membrane and secondly to have at any time during the undulation one module functioning in extension and one module functioning in retraction.

As illustrated in FIG. 4, when modules are located on the same face of the membrane, it is possible to ensure that these modules are located so as to be staggered in order to have their connections with the membrane distributed at a reduced assembly pitch less than the maximum length L of these modules. This feature makes it possible to have a more even collection of mechanical energy of the membrane.

It should be noted that this staggered arrangement may be on one or both faces of the membrane.

It is also possible for the coils to be connected so as to generate multiphase currents. It is also possible to have a plurality of coils per module.

The invention claimed is:

1. An electricity generator comprising:
   a membrane and a support for the membrane, the membrane being adapted to undulate in a longitudinal direction of the membrane when said membrane is immersed in a fluid flowing in a given direction and is supported by the membrane support;
   a first electricity generation module carried by the membrane, the first electricity generation module comprising:
   a fixed frame;
   a movable frame able to move with respect to the fixed frame;
   a coil carried by one of the fixed frame and the movable frame;
   at least one permanent magnet carried by the other of the fixed frame and the movable frame;
   said coil and said at least one permanent magnet being arranged and disposed so that, when the movable frame moves with respect to the fixed frame, an electrical voltage is induced in the coil;
   the generator further being characterised in that the fixed frame of said first electricity generation module is connected to the membrane, and the movable frame of said first module is offset from a neutral axis of the membrane so that, when the membrane undulates in the longitudinal direction, there is, for said first electricity generation module, a movement of the movable frame of said first electricity generation module by rectilinear sliding with respect to the fixed frame of said first electricity generation module so as to induce the electrical voltage in the coil of said first electricity generation module.

2. The generator according to claim 1, wherein the movable frame has an inherent articulation axis through which there are transmitted forces relating to the rectilinear sliding of the movable frame with respect to the fixed frame,
   wherein said rectilinear sliding of the movable frame with respect to the fixed frame defines a direction of rectilinear sliding of the movable frame,
   wherein the inherent articulation axis is perpendicular to the direction of the rectilinear sliding of the movable frame with respect to the fixed frame, and the inherent articulation axis is offset with respect to a surface of the membrane facing the first electricity generation module, the offset of the inherent articulation axis being at least equal to a thickness of the membrane.

3. The generator according to claim 2, wherein during the undulation of the membrane in the longitudinal direction, the direction of rectilinear sliding of the movable frame is always parallel to a longitudinal cross-sectional plane of the membrane in which the longitudinal direction of the membrane extends.

4. The generator according to claim 1, comprising a second electricity generation module, said first and second electricity generation modules being aligned and connected together by a mechanical connection so that the movable frame of said first electricity generation module is mechanically connected to a fixed frame of said second electricity generation module, said mechanical connection being such that relative movement of the fixed frames of said first and second electricity generation modules results in movement of the movable frame of the first electricity generation module with respect to the fixed frame of the first electricity generation module.

5. The generator according to claim 4, wherein said mechanical connection comprises a part articulated on a side of the fixed frame of the second electricity generation module and on a side of the movable frame of the first electricity generation module.

6. The generator according to claim 4, in which the first and second electricity generation modules are aligned with each other in an alignment direction parallel to a longitudinal cross-sectional plane of the membrane, the first and second electricity generation modules being covered by a shroud extending parallel to the longitudinal direction of the membrane.

7. The generator according to claim 1, comprising a converter circuit distant from the first electricity generation module, the coil of the first electricity generation module being electrically connected to the converter circuit by electrical conductors and said converter circuit being arranged so as to generate, from the electrical voltage induced in the coil of the first electricity generation module, an output electrical current at an output terminal of said converter circuit.

8. The generator according to claim 1, wherein the fixed frame of the first electricity generation module is offset from and connected to the membrane by deformable elastic studs.

9. The electricity generator according to claim 1, wherein the first electricity generation module has an inherent length that extends parallel to a longitudinal cross-sectional plane of the membrane in which said longitudinal direction of the membrane is situated.

10. An electricity generator comprising:
    a membrane and a support for the membrane, the membrane being adapted to undulate in a longitudinal direction of the membrane when said membrane is immersed in a fluid flowing in a given direction and is supported by the membrane support;
    a first electricity generation module carried by the membrane, the first electricity generation module comprising:
    a fixed frame;
    a movable frame able to move with respect to the fixed frame;
    a coil carried by the fixed frame;
    at least one permanent magnet also carried by the fixed frame;
    wherein the fixed frame of said first electricity generation module is connected to the membrane, and the movable frame of said first module is offset from a neutral axis of the membrane so that, when the membrane undulates in the longitudinal direction, there is, for said first electricity generation module, a movement of the movable frame of said first electricity generation module by rectilinear sliding with respect to the fixed frame of said first electricity generation module, wherein said movable frame of the first electricity generation module further comprises a bar facing said at least one magnet of the first electricity generation module, the bar moving by the rectilinear sliding of the moveable frame when the membrane undulates in the longitudinal direction, the fixed frame of the first module carrying a counter-bar, wherein an inter-bar distance measured between the bar and the counter-bar varies when the membrane undulates in the longitudinal direction, and wherein the variation in the inter-bar distance caused by the rectilinear sliding of the bar creates a variation in magnetic flux from the permanent magnet passing through the coil, to thereby induce an electrical voltage in the coil.

* * * * *